R. B. PRICE.
PROCESS OF MAKING RUBBER BAGS, BOTTLES, AND THE LIKE.
APPLICATION FILED NOV. 12, 1915.
1,287,429.
Patented Dec. 10, 1918.
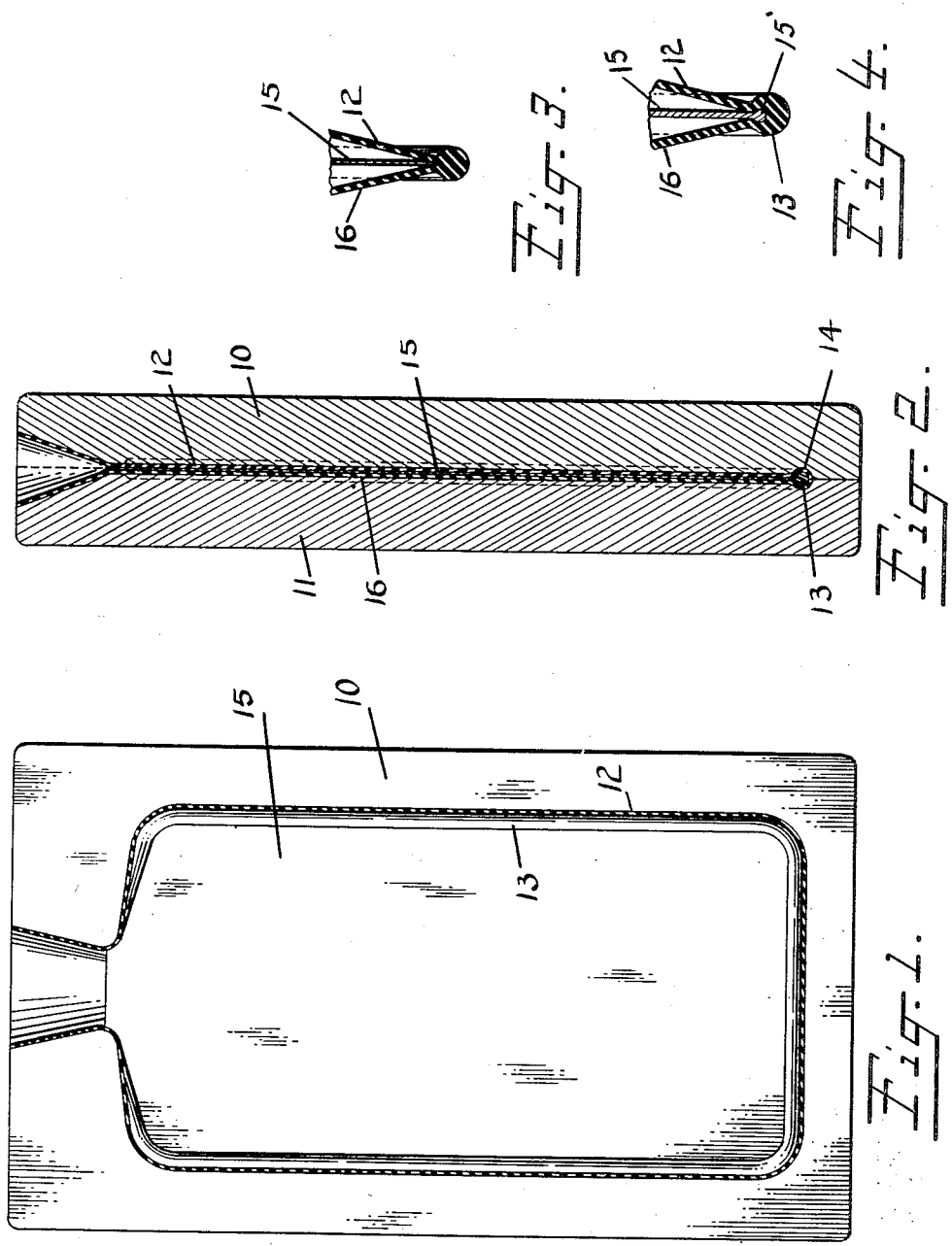
WITNESS:
INVENTOR
Raymond B. Price,
BY
HIS ATTORNEY

UNITED STATES PATENT OFFICE.

RAYMOND B. PRICE, OF NEW YORK, N. Y., ASSIGNOR TO RUBBER REGENERATING COMPANY, A CORPORATION OF INDIANA.

PROCESS OF MAKING RUBBER BAGS, BOTTLES, AND THE LIKE.

1,287,429.                Specification of Letters Patent.      Patented Dec. 10, 1918.

Application filed November 12, 1915. Serial No. 61,039.

*To all whom it may concern:*

Be it known that I, RAYMOND B. PRICE, a citizen of the United States, residing at New York, county of New York, and State of New York, have invented certain new and useful Improvements in Processes of Making Rubber Bags, Bottles, and the like, of which the following is a full, clear, and exact description.

This invention relates to processes of making rubber articles such as water-bottles or bags, syringe-bags, and other hollow articles having contracted necks or openings.

The invention has for its object to provide a process of manufacturing a molded rubber article of this character without the use of a forming core in conjunction with the mold.

One method of making articles of this class has been to lapjoin by hand work the raw sheet rubber sides or walls of the article, lay a thin sheet rubber reinforcing strip across the lapped edges, apply cement where the parts overlap each other, and finally vulcanize the product in open heat with the inner confronting faces of the walls separated from each other by an anti-sticking medium such as powdered soap stone which prevents union of the faces during vulcanization. The article constructed in this manner is weak at the cemented joints. To obviate such weakness a well known method of manufacturing articles of this type consists of vulcanizing the raw sheet rubber sides or walls of the article in a mold, with a forming core between the rubber sides, which core resists the pressure of the mold during closing of the mold sections and acts in conjunction with the sections in shaping and unifying the seams of the body of the article. However, a disadvantage of this method is that the forming core must be removed after vulcanization of the article, and to accomplish this a slit is made somewhere in the wall of the article, the edges of which slit must be joined after removal of the core, and here again a weak place exists at this joint.

The present invention provides a process wherein the advantageous mold cure of the article may be utilized without the disadvantage of a forming core, the process effecting separation of the inner faces of the raw rubber sides of the article by means of a yielding blank which resists in no way the pressure of the mold sections and consequently remains intact during cure of the article, such blanks being formed of material which in some instances can be dissolved, disintegrated, or otherwise reduced or broken up and the remains removed through the neck or mouth of the vulcanized article, and in other instances can be withdrawn bodily, more or less intact, through the neck or mouth of the article.

With respect to the blank, there is a wide latitude for choice of materials, and I do not limit myself to any special yielding material, nor do I limit myself to any manner of getting the same in or out of the article, it being only essential that the material be adapted to yieldably but positively separate the confronting inner faces of the sheet rubber sides of the walls of the article during a mold cure, and if desired be thereafter capable of removal through the neck or mouth opening of the article.

The invention can be readily understood from the following description taken in connection with the accompanying drawing, in which—

Figure 1 is a plan view showing one half of a rubber bottle seated in its corresponding mold section and showing the separating blank in position on the same;

Fig. 2 is a longitudinal sectional view through the mold with the article confined therein and the walls thereof separated ready for vulcanization.

Fig. 3 is a fragmentary sectional view through a portion of the bottle distended to facilitate removal of the separating blank;

Fig. 4 is a fragmentary sectional view showing a modified form of blank.

In carrying out the invention I preferably utilize mold sections 10 and 11 of the usual and well known type, the sections having registering inner concavities adapted to give the desired contour to the product. In one section of such a mold I place sheet rubber material sufficient for a wall 12 of the article, the sheet preferably having a marginal outline corresponding to the marginal outline of the forming cavity of the mold.

A bead of raw rubber material 13, preferably of circular cross section although not necessarily so, is then disposed in the border groove 14 of the forming cavity in the mold section, which bead subsequently serves to unite the walls of the body of the article during vulcanization.

Next I place on the wall 12 a separating blank 15 having a marginal contour adapted to conform to the contour of the wall 12. The marginal edge of the blank may be plain as shown most clearly in Fig. 3 or may be beaded as shown at 15' in Fig. 4.

I next place the mating raw rubber wall 16 of the article in the forming recess of the corresponding mold section 11, and assemble both mold sections in the usual manner. The mold with the unvulcanized rubber article disposed around the separating blank is then placed in a vulcanizer and preferably subjected to exterior pressure during cure so that the sections are closed tightly together and exert the usual compacting pressure to unite the various contacting rubber parts of the article into an integral unitary whole.

The separating blank used in the manufacture of the rubber article may be made of any yielding or flexible or limp sheet material which can be given the desired shape and which after use in the production of the article, can, if desired, be removed through the constricted neck opening of the product. In some instances I employ for this purpose a suitable grade of paper which is comparatively inexpensive and can be readily dissolved, disintegrated or otherwise reduced or broken up for removal through the neck opening, or which may even be left in the article when the intended use of the article is such that its presence is not detrimental. In other instances I employ a fabric or other blank which can be grasped and readily removed through the constricted neck opening of the article, and a blank of this type obviously may be used a great many times, in contradistinction to the loss of the paper blank after each operation.

In practice it has been found beneficial to treat or coat the blank with glazing material such as for instance water-glass, although this is not essential, for the blank can be used plain with good results. Although I have designated one type of treating material which is beneficial, I do not limit myself to this material as any desired treating substance may be employed which will have the effect of minimizing or preventing sticking of the raw rubber walls of the article to the blank.

It is obvious that a limp, or flexible, or yielding blank, used as above described in the manufacture of hollow rubber articles, resists in no way the pressure of the closed mold sections, or at least is comparatively non-resisting to the pressure of the mold sections, and thus can have no compacting and shaping utility as the forming core hitherto used in producing molded rubber articles. Moreover the blank presents a continuous or uninterrupted surface to the rubber walls of the article, which surface is unsupported by any metal or like marginal frames or otherwise localized reinforcements so that maximum willingness to yield in adjusting itself to the pressure of the mold sections is assured.

After the article has been subjected to the desired temperature for a sufficient length of time to complete the desired degree of vulcanization in the product, the mold is opened and the separating blank in some instances is then removed through the restricted neck opening of the article, and to accomplish the latter it is preferable that the walls of the article be distended as shown best in Figs. 3 and 4 to permit the blank being acted upon by any suitable means inserted through the neck opening of the article for dissolving, disintegrating or even withdrawing the blank more or less intact from the article, when this is possible from the nature of the material.

Having thus described my invention what I now claim as new and desire to protect by Letters Patent is:

1. The method of making a vulcanized rubber water bag having a mouth at one end for filling same which consists in forming the material in sheets, cutting blanks therefrom to form side walls for the article possessing continuity throughout their entire areas, assembling the blanks in a mold about a freely pliable separating sheet which permits the joining of oppositely disposed edges of said side walls, vulcanizing the article while maintaining said continuity, folding said separating sheet to assume a cross-section permitting of its removal through the mouth of the article, and finally removing the separating sheet through said mouth.

2. The method of making hollow rubber articles of vulcanizable rubber compound which consists in forming the material in sheets, cutting blanks therefrom to form side walls for the article, assembling the blanks in a mold about a freely pliable separating sheet which permits the joining of oppositely disposed edges of said side walls in said mold, vulcanizing the article, deforming said separating sheet, and withdrawing the deformed sheet through an opening in said article.

3. The method of making hollow rubber articles of vulcanizable plastic compound which consists in forming the material in sheets, cutting blanks therefrom uniting the blanks about their margins by vulcanization while maintaining the un-united surfaces continuous throughout their entire areas and separated throughout by a sheet of pliable material, deforming said separating sheet, and withdrawing the deformed sheet through an opening in said bottle.

Signed at New York city, New York, this 10th day of November, 1915.

RAYMOND B. PRICE.